United States Patent [19]

Akin

[11] 4,109,901
[45] Aug. 29, 1978

[54] MITER TABLE FOR PORTABLE CIRCULAR SAW

[76] Inventor: Paul A. Akin, 25808 County Rd. 6, Elkhart, Ind. 46514

[21] Appl. No.: 813,094

[22] Filed: Jul. 5, 1977

Related U.S. Application Data

[63] Continuation-in-part of Ser. No. 686,253, May 13, 1976, abandoned.

[51] Int. Cl.² .......................... B27B 9/04; B27B 5/20
[52] U.S. Cl. .................................. 269/290; 83/522; 83/745; 269/315
[58] Field of Search .................. 269/290, 315, 307, 1; 83/522, 745

[56] References Cited

U.S. PATENT DOCUMENTS

| 2,916,063 | 12/1959 | Boekenkamp | 83/522 |
| 3,741,063 | 6/1973 | Bretthauer | 83/745 |

*Primary Examiner*—Robert C. Watson
*Attorney, Agent, or Firm*—Marmaduke A. Hobbs

[57] ABSTRACT

A miter table for portable circular saws in which an arm movable in a vertical plane is pivoted on a horizontally disposed base, and a fence is pivotally mounted on the base and movable to various angular positions for holding material to be cut. A carriage is mounted on the arm and is movable forwardly and rearwardly thereon, supporting a saw for performing the cutting operation as the saw moves from the forward to the rearward carriage positions. A platform is attached to the fence and pivots therewith and is provided with an arcuate forward edge with a scale thereon for assisting in adjusting the fence to various angular positions.

9 Claims, 7 Drawing Figures

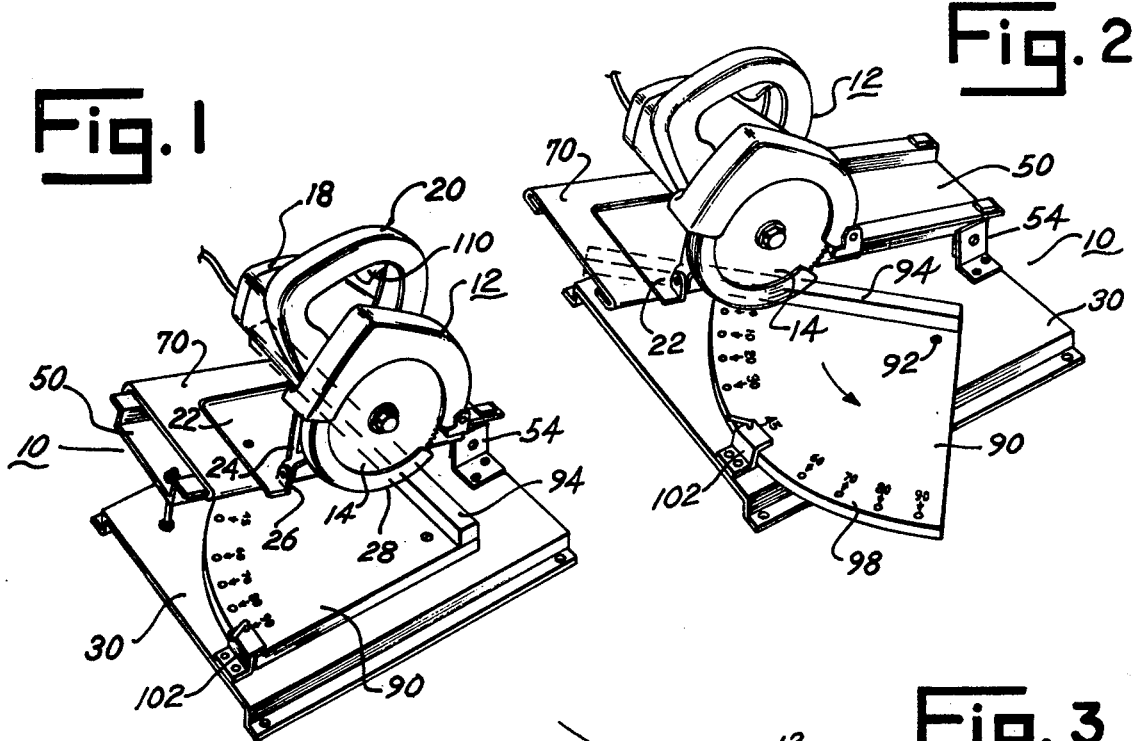
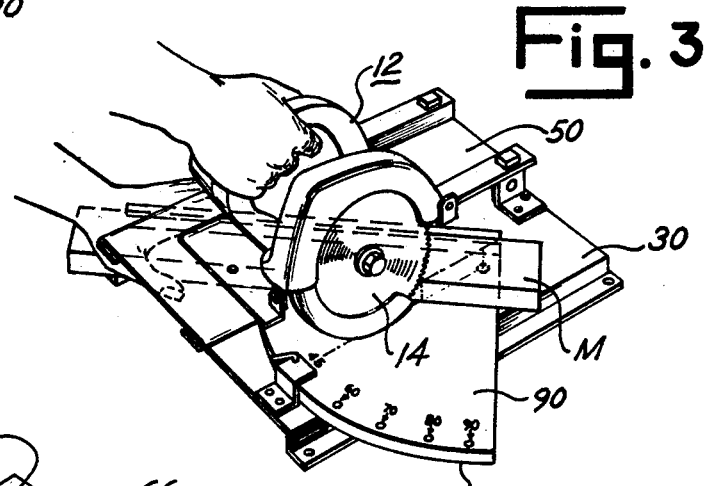
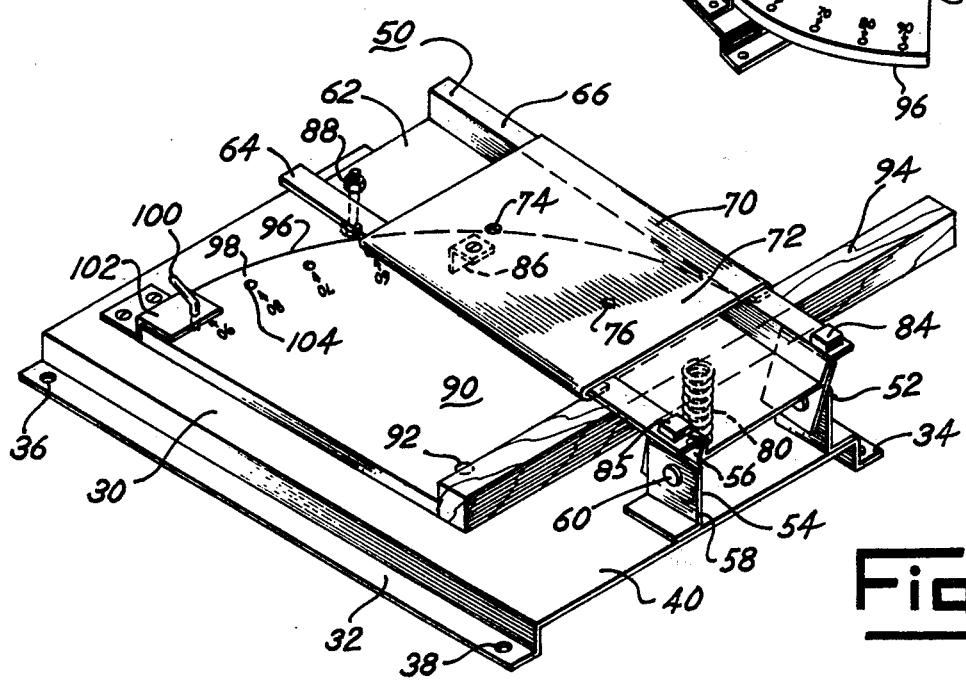

MITER TABLE FOR PORTABLE CIRCULAR SAW

This application is a continuation-in-part of my copending application Ser. No. 686,253 filed May 13, 1976 now abandoned.

Portable electric circular saws are extensively used by the handy man, carpenters and other construction workers on the construction site, and are highly advantageous in rough cutting construction materials, particularly framing material such as studding, rafters, joists, flooring and trim, and are useful in cutting paneling and siding. A fence is often provided with the saw, but it is difficult to use in many operations; hence, the workman usually performs the cutting operation by marking a line on the material to be cut with a pencil or scriber and then guides the saw by hand along the line. This operation is satisfactory for cutting material for framing and the like; however, it is not sufficiently accurate or reliable in cutting trim and other close fitting members, unless the operator is highly skilled and capable of holding the saw accurately on the line and at the desired angle. Portable circular hand saws are also often used in home shops to perform rather intricate operations; however, few people have the skill to use the saw with sufficient accuracy and control to produce quality work for such types of operations as cabinets, furniture, inside trim and the like. Further, it is well known that portable electric circular saws in the hands of an unskilled operator are hazardous and can cause serious injury to the operator as well as ruin material by accidentally making unintentional cuts and permitting the saw to slip during the cutting operation. It is therefore one of the principal objects of the present invention to provide a miter table for use with a portable electric circular saw, which will provide full and accurate control of the saw by the operator, and which permits the operator simultaneously to hold the material being cut firmly in place to obtain a cut at the desired angle and bevel.

Another object of the present invention is to provide a miter table for a portable circular saw, which is compact in construction and can be easily transported and set up for operation at various locations, and which is so constructed and designed that the portable saw can easily and readily be mounted on and removed from the table, so that the saw is available for use either as a conventional portable saw or for use in conjunction with the miter table.

Still another object of the invention is to provide a miter table which permits an unskilled operator to perform accurate, high quality workmanship on material with a portable electric circular saw, and which permits the operator to use the saw safely while holding the material being cut firmly in place for the desired cut.

A further object is to provide a miter table of the aforesaid type which is simple in construction and operation, and which can perform a variety of different operations using the conventional portable circular saw without changing either the saw or table in substantial manner and without performing any difficult adjustment preparatory to the cutting operation.

Additional objects and advantages of the present invention will become apparent from the following description and accompanying drawings, wherein:

FIG. 1 is an elevational view of the present miter table for a portable circular saw, showing the fence thereof in one operating position;

FIG. 2 is a perspective view similar to FIG. 1, of a table for a portable circular saw, showing the fence thereof in another operating position;

FIG. 3 is a perspective view of the miter table shown in FIGS. 1 and 2, illustrating the manner in which the table is used with a portable circular saw;

FIG. 4 is an enlarged perspective view of the miter table shown in the preceding figures, with the portable saw removed therefrom;

Figure 5:
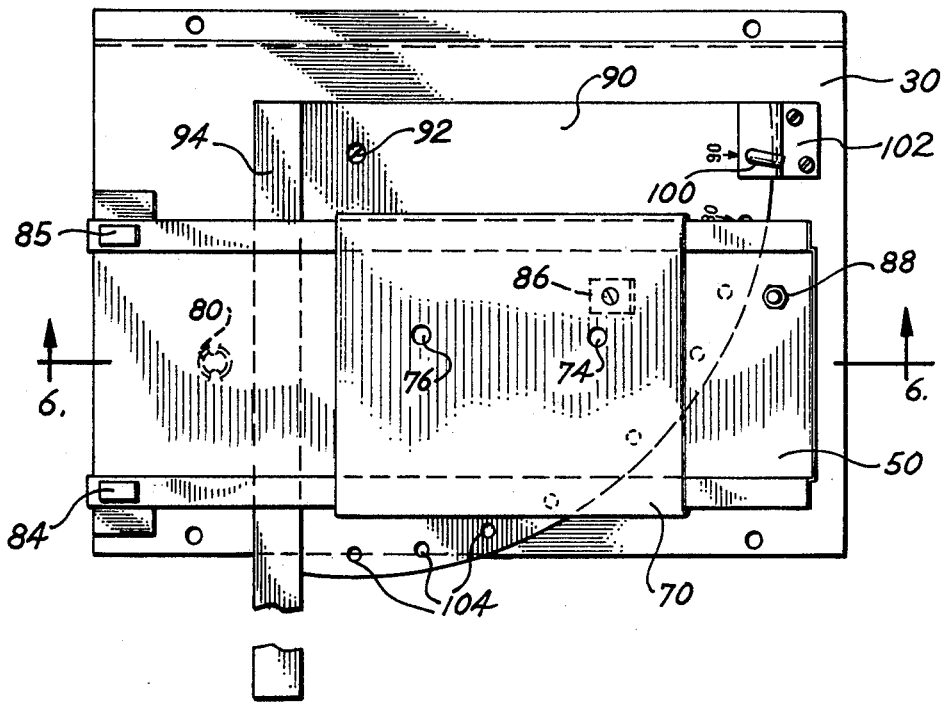
FIG. 5 is a top plan view of the miter table shown in the preceding figures with the saw removed.
Figure 6:
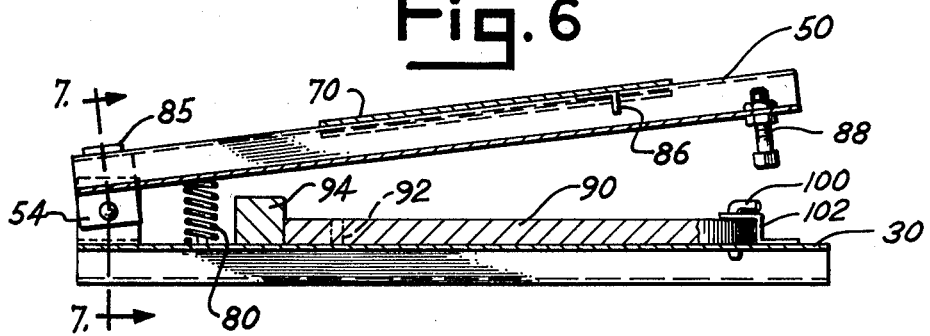
FIG. 6 is a vertical cross sectional view of the miter table, the section being taken on line 6—6 of FIG. 5.
Figure 7:
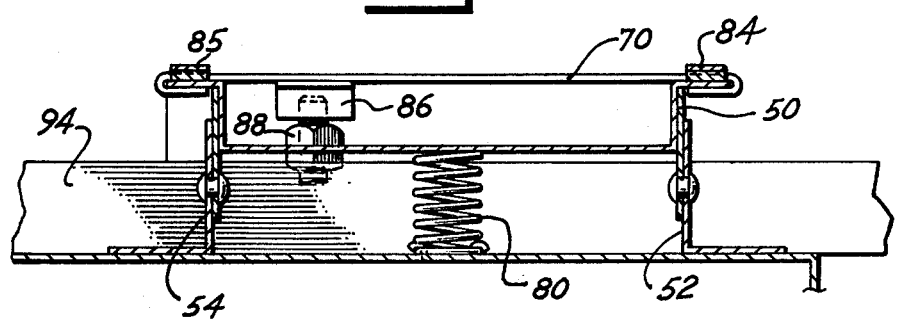
FIG. 7 is a vertical cross sectional view of the miter table shown in the preceding figures, the section being taken on line 7—7 of FIG. 6.

Referring more specifically to the drawings, numeral 10 designates generally the present miter table for a portable circular saw and numeral 12 indicates an electric portable circular saw mounted on the miter table for use in conjunction therewith. The circular saw is considered conventional for the purpose of the present invention and includes a circular blade 14, electric motor 18, handle 20 and a base plate 22 which supports the saw. The motor and saw are connected to the base plate by a frame 24 pivotally connected to the base plate at numeral 26 so that the saw can be placed at different angles for sawing beveled cuts. A guard 28 which is included for the protection of the operator, automatically retracts to permit effective cutting operations as the saw is moved with respect to the material being cut, as will be more fully explained hereinafter. Various makes and models of portable circular saws may be used in conjunction with the present miter table without making any appreciable changes in either the saw or the table.

The table 10 consists of a metal base 30 having flanges 32 and 34 which may be mounted on a work bench or saw horses or on permanent legs attached thereto, normally using bolts in holes 36 and 38 at opposite ends of the respective flanges. The intermediate panel 40 is preferably rigid and flat so that the base forms a firm support for material being cut. An arm 50 for supporting the saw is pivotally secured to the base by brackets 52 and 54, each bracket consisting of an upper portion 56 and a lower portion 58 pivotally connected to one another by a bolt or pin 60. The lower portion 58 of each bracket is rigidly secured to the base, preferably by welding, and the upper portion 56 of each bracket is rigidly connected to arm 50, normally by welding, clamping or bolting.

The arm 50 is of heavy sheet metal construction and consists of an intermediate panel 62 and upturned flanges 64 and 66 along each edge. A carriage 70 is mounted on the arm and is slidable on flanges 64 and 66 which form laterally spaced parallel tracks for the carriage so that the carriage will move freely along the arm. The carriage is likewise constructed of steel and has a top panel 72 with holes 74 and 76 for attaching the base plate 22 of saw 12 rigidly thereto. Thus the carriage and saw move forwardly and rearwardly freely along the arm. The arm is urged upwardly to its raised position by a coil spring 80 reacting between the upper surface of panel 40 of the base and the underside of panel 62 of arm 50, the spring being held in place preferably by lugs or screws attached to panels 40 and 62 at the bottom and top of the spring, respectively. The weight of the saw and arm may be sufficient to counteract the force of the spring to retain the arm in an upwardly angular position after the spring has been substantially fully extended; however, a stop near the pivoted end of the arm may be used advantageously to provide a fixed position when the arm is in its raised position. The maximum rearward movement of the carriage is determined by a pair of stops 84 and 85 mounted on the upper surface of flanges 64 and 66 and the maximum forward position is determined by lug 86 secured to the lower surface of the carriage and engaging a stop 88 when the carriage is pulled forwardly.

In the present miter table, the angle of the miter is readily determined and maintained by platform 90 mounted on panel 40 of base 30, the platform being pivoted to panel 40 by a bolt or pin 92 extending downwardly through the platform and through a hole in panel 40. With the pivoted arrangement, the platform rotates on the pin to the various angular positions. The material is held firmly in place on the platform by a fence 94 secured rigidly to the rear edge thereof, and the forward edge 96 of the platform consists of an arc of a circle. A scale, indicated generally by numeral 98 with degrees marked thereon, assists in positioning the miter platform and fence in proper angular position for the desired cut. The angle selected is maintained in a fixed position by a pin 100 extending down through a fixture 102 into one of a number of spaced holes 104 in the platform. While the pin is removed, the platform is pivoted on pin 92 to the desired angle or degree, and when the platform has been properly positioned to the desired angle, the pin is inserted downwardly through the fixture into the hole in the platform beneath the fixture. The platform and fence are both preferably constructed of wood, since in use, the saw will normally score the upper surface of the platform and cut a notch in the fence. The fence is preferably attached to the platform by a couple of screws to permit the fence to be removed and replaced when it becomes so seriously notched that it is incapable of functioning effectively as a shoulder against which the material can be held firmly during the cutting operation.

The arm 50 contains an adjustable stop 88 which, as illustrated, is a bolt with a couple of nuts thereon to permit adjustment thereof lengthwise and hence thereby control the downward travel of the arm. The stop likewise controls the downward limit of the saw and permits the operator to adjust the lower position of the saw so that it may cut the material with a minimum amount of scoring in the upper surface of the platform. When functioning as a stop the lower end of the bolt, i.e. the head shown in the drawings, engages the upper surface of panel 40, thereby permitting the bolt to form a rigid and accurate stop of the arm.

In the operation and use of the foregoing miter table, a conventional portable saw is mounted on arm 50 by bolting or otherwise firmly attaching plate 22 of the saw to carriage 70. With the saw mounted on the arm and with the carriage pulled forwardly, preferably to the position where lug 86 engages stop 88, a board or other strip of material M to be cut is placed on platform 90 after the platform has been adjusted to the desired angle. This adjustment is made by rotating the platform on pin 92 and retaining the platform in its adjusted position by inserting pin 100 downwardly through one of the holes 104 of the platform. The operator then holds the board or other strip of material firmly against the forward face of fence 94 with one hand and lowers the arm until the stop engages panel 40 or the material to be cut, and then turns on the saw by the use of trigger switch 110 under the underside of handle 20. The saw in full operation is pushed rearwardly with carriage 70, causing the guard to retract upward and permitting the blade of the saw to engage and cut the material. The saw is pushed rearwardly until it has made the desired cut and is then retracted to its original forward position with lug 86 against stop 88. A conventional portable circular saw can be pivoted on a longitudinal axis to provide the desired bevel, thus permitting a multiple beveled cut by angularly adjusting platform 90 and the pivotal adjustment of the saw on the longitudinal axis between plate 22 and frame 24, thereby tilting the saw blade relative to the vertical plane. If the saw is needed for use as a conventional portable saw, it can be readily removed from the table by removing the retaining screws which hold plate 22 on carriage 70.

It is seen that the present miter table permits effective and accurate use of a conventional portable circular saw without sacrificing the normal use of the saw, and at the same time providing a miter table which can be easily transported and used at the construction site. It can also be effectively used in a home workshop, as either a table or bench saw. Since the saw is held firmly by arm 50 while the sawing operation is being performed, the operation can be accurately accomplished without any skill or prior training by the operator, thus greatly enhancing the accuracy and safety of the operation by the casual user.

While only one embodiment of the present miter table for a portable circular saw has been described in detail herein, various changes and modifications may be made without departing from the scope of the invention.

I claim:

1. A miter table for portable circular saws, comprising a base having a forward and rearward end, an arm pivoted to said base near the rearward end thereof and movable angularly on a vertical plane toward and away from said base, a carriage for supporting the saw on said arm in cutting position and being movable forwardly and rearwardly on said arm, a means for securing the saw rigidly to said carriage, a fence pivotally connected on a fixed vertical axis to said base and movable to various angular positions relative to said arm for holding material while being cut, a platform mounted on said base forwardly of said fence and rigidly attached to said fence for pivotal movement therewith, means disposed near the forward edge of said platform for retaining said fence and said platform in an adjusted position, and an adjustable stop means for determining the lowermost position of said arm with respect to said base.

2. A miter table for portable circular saws as defined in claim 1 in which the forward edge of said platform is an arc of a circle, and a scale is provided on said forward edge for assisting in the adjustment of the fence to various desired angles.

3. A miter table for portable circular saws as defined in claim 1 in which a resilient means is provided for urging said arm upwardly.

4. A miter table for portable circular saws as defined in claim 1 in which said base includes a center panel on which said fence is mounted, and a flange means for attaching said base to a supporting structure.

5. A miter table for portable circular saws as defined in claim 2 in which said base consists of a center panel on which said fence is mounted, and a flange means for attaching said base to a supporting structure.

6. A miter table for portable circular saws as defined in claim 1 in which a stop means is provided for determining the forward and rearward limits for said carriage, and means is provided for mounting the saw on the carriage with the blade in cutting position when the saw is moved rearwardly from the forward end of the arm.

7. A miter table for portable circular saws as defined in claim 2 in which a stop means is provided for determining the forward and rearward limits for said carriage, and means is provided for mounting the saw on the carriage with the blade in cutting position when the saw is moved rearwardly from the forward end of the arm.

8. A miter table for portable circular saws as defined in claim 1 in which said arm includes laterally spaced track means and said carriage includes a generally flat center panel and laterally disposed means for engaging the said track means for slidably retaining said carriage on said arm.

9. A miter table for portable circular saws as defined in claim 8 in which fixtures are attached to the rear end of said arm for pivotally attaching the rear end firmly to the rear end of said base.

* * * * *